US012151472B2

(12) United States Patent
Hosaka

(10) Patent No.: US 12,151,472 B2
(45) Date of Patent: Nov. 26, 2024

(54) LIQUID DISCHARGE APPARATUS AND LIQUID DISCHARGE METHOD

(71) Applicant: Shigetoshi Hosaka, Kanagawa (JP)

(72) Inventor: Shigetoshi Hosaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 204 days.

(21) Appl. No.: 18/058,944

(22) Filed: Nov. 28, 2022

(65) Prior Publication Data

US 2023/0226815 A1 Jul. 20, 2023

(30) Foreign Application Priority Data

Jan. 14, 2022 (JP) ................................ 2022-004550

(51) Int. Cl.
*B41J 2/045* (2006.01)

(52) U.S. Cl.
CPC ........... *B41J 2/0451* (2013.01); *B41J 2/0458* (2013.01); *B41J 2/04581* (2013.01)

(58) Field of Classification Search
CPC ...... B41J 2/2114; B41J 11/0015; B41J 3/4078
See application file for complete search history.

(56) References Cited

U.S. PATENT DOCUMENTS 10,744,795 B2 * 8/2020 Harada .................. B41J 2/2114
10,850,534 B2 * 12/2020 Mizuno .................... B41M 5/00
2007/0085869 A1 4/2007 Hirano et al.
2007/0091135 A1 4/2007 Hosaka et al.
2008/0018703 A1 1/2008 Nakano et al.
2008/0068412 A1 3/2008 Kikuchi et al.
2008/0117467 A1 5/2008 Hosaka et al.
2008/0123146 A1 5/2008 Ike et al.
2008/0137147 A1 6/2008 Nakano et al.
2009/0080002 A1 3/2009 Nakano et al.
2010/0141707 A1 8/2010 Nakano et al.
2010/0231631 A1 9/2010 Hosaka et al.
2011/0273746 A1 11/2011 Hoshino et al.
2012/0314259 A1 12/2012 Hosaka
2015/0254536 A1 9/2015 Hosaka
2016/0026904 A1 1/2016 Hosaka
2016/0236462 A1 8/2016 Hosaka
2017/0210144 A1 7/2017 Hosaka
2022/0297443 A1 9/2022 Hosaka

FOREIGN PATENT DOCUMENTS

JP 2009-220527 10/2009
JP 2014-151549 8/2014

* cited by examiner

*Primary Examiner* — Sharon Polk
(74) *Attorney, Agent, or Firm* — IPUSA, PLLC

(57) ABSTRACT

A liquid discharge apparatus includes: an applicator configured to apply a first liquid onto a surface of a fabric medium to increase repellency of the surface of the fabric medium; a head configured to discharge a second liquid onto the surface of the fabric medium, onto which the first liquid has been discharged; a detector configured to detect the repellency of the surface of the fabric medium on which the first liquid has been discharged; circuitry configured to: determine whether the repellency detected by the detector is equal to or larger than a predetermined repellency; and control the applicator to further apply the first liquid onto the surface of the fabric medium in response to a determination in which the repellency detected by the detector is lower than the predetermined repellency.

9 Claims, 5 Drawing Sheets

LIQUID DISCHARGE APPARATUS AND LIQUID DISCHARGE METHOD

CROSS-REFERENCE TO RELATED APPLICATIONS

This patent application is based on and claims priority pursuant to 35 U.S.C. § 119(a) to Japanese Patent Application No. 2022-004550, filed on Jan. 14, 2022, in the Japan Patent Office, the entire disclosure of which is hereby incorporated by reference herein.

BACKGROUND

Technical Field

The present embodiment relates to a liquid discharge apparatus and a liquid discharge method.

Related Art

A liquid discharge apparatus discharges liquid onto a medium, based on an image formation instruction from an information processing apparatus and the like. The liquid discharge apparatus also functions as an image forming apparatus for forming an image on a medium. The liquid discharge apparatus is often referred to as an inkjet printer including a liquid discharge head that discharges a liquid onto a medium. In recent years, there is an inkjet printer using a fabric such as garment (T-shirts) as a medium among inkjet printers. Such an inkjet printer using the fabric such as garment (T-shirts) is referred to as "Direct To Garment (DTG) printer".

White ink is used when a color image is formed on a fabric as a medium (hereinafter referred to as "fabric medium"). If the color of the fabric medium (background color) is black and the like, when the white ink adhering to a surface of the fabric medium (medium surface) permeates into the fabric medium, it is not possible to fully obtain "whiteness" that should be otherwise obtained. Thus, an expression different from the expression intended by the white color in an image to be formed occurs, and image quality may thus be deteriorated.

To prevent such image quality deterioration, there is a technique that previously applies a chemical that makes the white ink likely to aggregate in a place where the white ink is discharged on the fabric medium to perform pretreatment to prevent the white color from being buried in the fabric medium. The chemical used for the pretreatment may be referred to as "pretreatment liquid".

There is a technique in which an amount of an amount of a liquid-repellent agent is adjusted before the pretreatment liquid is applied to the surface of the fabric medium based on a parameter of the pretreatment liquid to prevent deterioration in the image quality due to nonuniformity of the treatment liquid on the medium surface that causes unevenness in a reaction of the treatment liquid with the liquid ink.

SUMMARY

In an aspect of the present disclosure, a liquid discharge apparatus includes: an applicator configured to apply a first liquid onto a surface of a fabric medium to increase repellency of the surface of the fabric medium; a head configured to discharge a second liquid onto the surface of the fabric medium, onto which the first liquid has been discharged; a detector configured to detect the repellency of the surface of the fabric medium on which the first liquid has been discharged; circuitry configured to: determine whether the repellency detected by the detector is equal to or larger than a predetermined repellency; and control the applicator to further apply the first liquid onto the surface of the fabric medium in response to a determination in which the repellency detected by the detector is lower than the predetermined repellency.

In another aspect of the present disclosure, a liquid discharge method includes: applying a first liquid onto a surface of a fabric medium to increase repellency of the surface of the fabric medium; discharging a second liquid onto the surface of the fabric medium, onto which the first liquid has been discharged; detecting the repellency of the surface of the fabric medium on which the first liquid has been discharged; determining whether the repellency detected by the detecting satisfy predetermined repellency; and further applying the first liquid onto the surface of the fabric medium in response to a determination in which the repellency detected by the detecting does not satisfy the predetermined repellency.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
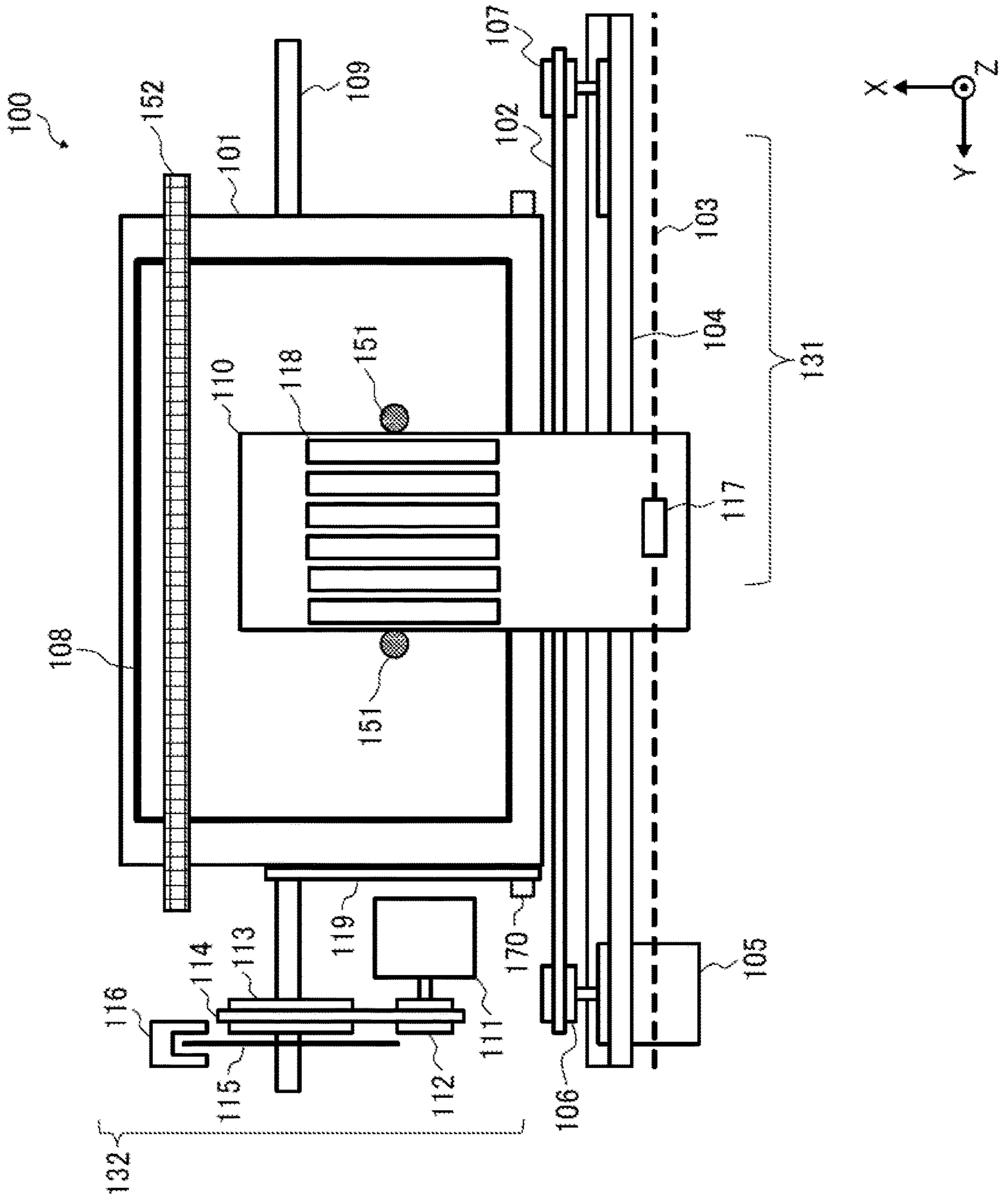
FIG. 1 is a schematic plan view illustrating main parts of an internal structure of a liquid discharge apparatus according to the present embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

[Embodiment of Liquid Discharge Apparatus]

An inkjet printer 100 as an embodiment of a liquid discharge apparatus according to the present embodiment will be described below. The inkjet printer 100 is also a type of image forming apparatus for discharging liquid ink toward a fabric (fabric medium) as a medium to form an image on the surface of the fabric medium (medium surface).

The inkjet printer 100 is provided therein with a pretreatment liquid applicator having a function of applying pretreatment liquid used to control aggregation of the liquid ink on the surface (medium surface) of the fabric medium before discharging the liquid ink onto the fabric medium. The pretreatment liquid applicator may be referred simply as an "applicator". The pretreatment liquid applicator may be a discharge head 118 as illustrated in FIG. 1 or a linear spray nozzle.

The inkjet printer 100 also includes a medium surface state detector that detects a state of the medium surface changing according to an amount of pretreatment liquid applied on the medium surface. The medium surface state detector may be referred simply as a "detector". A medium reader 15 illustrated in FIG. 3 may serve as the medium surface state detector (detector).

The inkjet printer 100 also includes a pretreatment liquid amount determination unit that determines whether the amount of pretreatment liquid applied on the medium surface is appropriate under a predetermined condition, based on a detection result in the medium surface state detector.

The inkjet printer 100 also includes a controller that controls overall operations of the pretreatment liquid applicator, the medium surface state detector, and the pretreatment liquid amount determination unit.

The controller controls a detection operation by the medium surface state detector immediately after the pretreatment liquid is applied on the medium surface in the pretreatment liquid applicator. The controller notifies the pretreatment liquid amount determination unit of information indicating the state of the medium surface detected by the medium surface state detector. The controller receives a result determined by the pretreatment amount determination unit, based on the information notified to the pretreatment liquid amount determination unit, and notifies the pretreatment liquid applicator of information for the pretreatment liquid applicator to control the amount of pretreatment liquid to be applied based on such a determination result.

As described above, the inkjet printer 100 determines whether the amount of pretreatment liquid immediately after being applied on the medium surface is a suitable amount for aggregating the liquid ink, and controls, according to the determination result, so that a suitable amount of pretreatment liquid remains on the medium surface.

According to the inkjet printer 100 having the above configuration, it is possible to apply a suitable amount of pretreatment liquid even if the water repellency of the medium surface is higher or lower than the predetermined water repellency. As a result, regardless of the water repellency of the medium surface, it is possible to ensure that the aggregation of the liquid ink on the medium surface is sufficient.

That is, the inkjet printer 100 controls so that an appropriate amount of pretreatment liquid is present on the medium surface before the liquid ink is discharged, to exhibit suitable water repellency on the medium surface. More particularly, the inkjet printer 100 has a function of determining the amount of pretreatment liquid present on the medium surface before the liquid ink is discharged and determining whether the amount of pretreatment liquid on the medium surface is large or small compared to the amount of pretreatment liquid appropriate for exhibiting a predetermined water repellency. When the amount of pretreatment liquid is large, the inkjet printer 100 controls the pretreatment liquid applicator to reduce the amount of pretreatment liquid to be applied, and when the amount of pretreatment liquid on the medium surface is small, the inkjet printer 100 controls the pretreatment liquid applicator to increase the amount of pretreatment liquid to be applied than a predetermined amount.

It is noted that the medium surface state detector includes a medium surface reader that optically reads the medium surface immediately after the pretreatment liquid is applied. For example, the medium surface reader includes an optical sensor that detects reflected light from light emitted toward a target. Based on a brightness difference possibly derived by detection of a change in reflected light by the pretreatment liquid applied on the medium surface, the optical sensor reads a degree of permeation (water repellency) of the pretreatment liquid on the media surface. Further, for example, the medium surface state detector includes a line sensor in which charge coupled device (CCD) sensors that optically reads the medium surface are arranged. The medium surface is scanned by the line sensor, and based on a difference in brightness between a background color of the medium surface and the pretreatment liquid to be applied, the degree of permeation (water repellency) of the pretreatment liquid on the medium surface is read. It is noted that the degree of permeation of the pretreatment liquid on the medium surface depends on the water repellency of the medium surface. Therefore, the medium surface state detector has a function of optically reading the water repellency of the medium surface and notifying information for determination in the pretreatment liquid amount determination unit.

It is noted that the medium surface state detector may also include an optical sensor as mentioned above, and may further include a unit holding a value, that is, a visually confirmed result, input by a user as a setting value used to control an amount of pretreatment liquid to be applied as a setting value by the user visually confirming the medium surface. The medium surface state detector may include a notification function of notifying the setting value held to allowing the pretreatment liquid amount determination unit to determine the setting value held.

As described above, the inkjet printer 100 detects the water repellency of the medium surface, and controls the amount of pretreatment liquid to be applied according to the detection result so that the amount of pretreatment liquid applied onto the medium surface is a suitable amount (state), and thus, the inkjet printer 100 controls so that the aggregation of the liquid ink on the media surface is in a suitable state. This improves the quality of the image formed on the fabric medium.

[Overview of Inkjet Printer 100]

Here, an overview of a hardware configuration of the inkjet printer 100 will be described. As illustrated in FIG. 1, the inkjet printer 100 holds a carriage 110 with a slide rail 104 integrated with a metal plate. For a scanning operation, a main scanning motor 105 reciprocally moves the carriage 110 in a main scanning direction via a timing belt 102 looped over a driving pulley 106 and a driven pulley 107. It is noted that as used herein, the main scanning direction is a Y direction illustrated in FIG. 1 and the like.

The carriage 110 includes a discharge head 118 that discharges liquid droplets of each liquid, that is, yellow (Y), cyan (C), magenta (M), black (K), white (W), and pretreatment liquid (S), for example. In the present embodiment, an example where the discharge head 118 is provided to correspond to each liquid is illustrated, and thus, a liquid discharge head includes six discharge heads. The discharge head 118 is mounted while a nozzle array on a nozzle surface formed thereon with a plurality of ink discharge ports (nozzles) are arranged in a direction perpendicular to the main scanning direction (sub-scanning direction), and each ink discharge port faces downward (in a direction of a conveyance platen 101). Further, as used herein, the sub-scanning direction is an X direction illustrated in FIG. 1 and the like. The discharge head 118 may be referred simply as a "head".

It is noted that although the discharge head 118 mounted on the carriage 110 is illustrated as that including a plurality of nozzle arrays for discharging ink droplets of each color, a configuration of each discharge head 118 applicable to the inkjet printer 100 is limited thereto. For example, the discharge head 118 independently corresponding to the ink droplets of each color may be employed. The number of colors applied as the ink droplets and an arrangement order of the discharge heads 118 are not limited.

A discharge head including, as a pressure generation unit that generates a pressure for discharging liquid droplets, a piezoelectric actuator such as a piezoelectric element, a thermal actuator utilizing a phase change due to film boiling of liquid using an electrothermal conversion element such as a heating resistor, and the like, may be employed for the discharge head 118. In addition to these actuators, a shape memory alloy actuator using a metallic phase change due to a temperature change, and an electrostatic actuator using an electrostatic force may also be employed for the pressure generation unit. In any configuration, the pressure generation unit may suffice if it is possible to discharge a specified amount of droplets of a specified color at a discharge timing instructed from outside.

The carriage 110 is attached with an optical sensor 151 included in a pretreatment liquid determination unit, near ends on both sides in the main scanning direction. When the discharge head 118 moves in the main scanning direction while discharging the pretreatment liquid, the optical sensor 151 detects a state of the medium surface immediately after the pretreatment liquid is applied, and notifies the controller 10 described later. This makes it possible to determine the water repellency of the medium surface along with the movement of the carriage 110.

The inkjet printer 100 is provided with an encoder scale 103 with a slit formed therein, along the main scanning direction. The carriage 110 is provided with an encoder sensor 117 that detects the slit of the encoder scale 103. These components configure a linear encoder 131 that detects a position in the main scanning direction of the carriage 110.

The inkjet printer 100 also includes a conveyance platen 101 serving as a medium holding member that holds a recording medium 108. The conveyance platen 101 is reciprocally moved in the sub-scanning direction by a conveyance mechanism with the recording medium 108 being held by the conveyance platen 101. At this time, the conveyance platen 101 reciprocates the recording medium 108 at a position facing the discharge head 118.

Any type of the recording medium 108 may be used as long as the recording medium 108 is held and conveyed by the conveyance platen 101. Therefore, for example, the recording medium 108 may be a fabric (fabric medium) such as clothing.

The conveyance platen 101 is configured to move in the sub-scanning direction (X direction) by using a sub-scanning motor 111 configuring a conveyance mechanism as a drive source. Between a conveyance driving pulley 112 arranged on a rotation shaft of the sub-scanning motor 111 and a conveyance roller pulley 113 arranged at a position apart from the conveyance driving pulley 112, a timing belt 114 is bridged. The rotation shaft of the conveyance roller pulley 113 is connected with a conveyance roller 109. With such a configuration, when the sub-scanning motor 111 is rotationally driven, the resulting driving force can rotate the conveyance roller 109 to move the conveyance platen 101.

The inkjet printer 100 is provided with an encoder wheel 115 being formed with a slit and being coaxial with the conveyance roller 109. An encoder sensor 116 that detects the slit of the encoder wheel 115 is provided. The encoder sensor 116 is provided on part of a side plate configuring a casing of the inkjet printer 100. With such a configurations, a wheel encoder 132 that detects a position in the sub-scanning direction of the conveyance platen 101 is configured.

It is noted that the conveyance platen 101 is of a flatbed type, and is horizontally conveyed in the sub-scanning direction via a timing belt 119 stretched between a conveyance roller and a tension roller 170.

The inkjet printer 100 also includes a line sensor 152 at a position across which the fabric medium placed on the conveyance platen 101 moves in the sub-scanning direction. When the medium immediately after the pretreatment liquid is discharged from the discharge head 118 moves in the sub-scanning direction by the conveyance platen 101, the line sensor 152 detects a state of the medium surface immediately after the pretreatment liquid is applied, and notifies the controller 10 described later. This makes it possible to determine the water repellency of the medium surface along with the movement of the carriage 110.

It is noted that similarly to the arrangement of the line sensors 152, the discharge heads that applies the pretreatment liquid may be installed and arranged in the main scanning direction, the pretreatment liquid may be discharged and applied from the discharge heads while the fabric medium is scanned in the sub-scanning direction, and the medium surface immediately thereafter may be detected by the line sensors 152.

Although FIG. 1 illustrates an example in which the inkjet printer 100 includes the optical sensor 151 and the line sensor 152, the inkjet printer 100 may include either one of the optical sensor 151 or the line sensor 152.

[Control Block Configuration]

Figure 2:
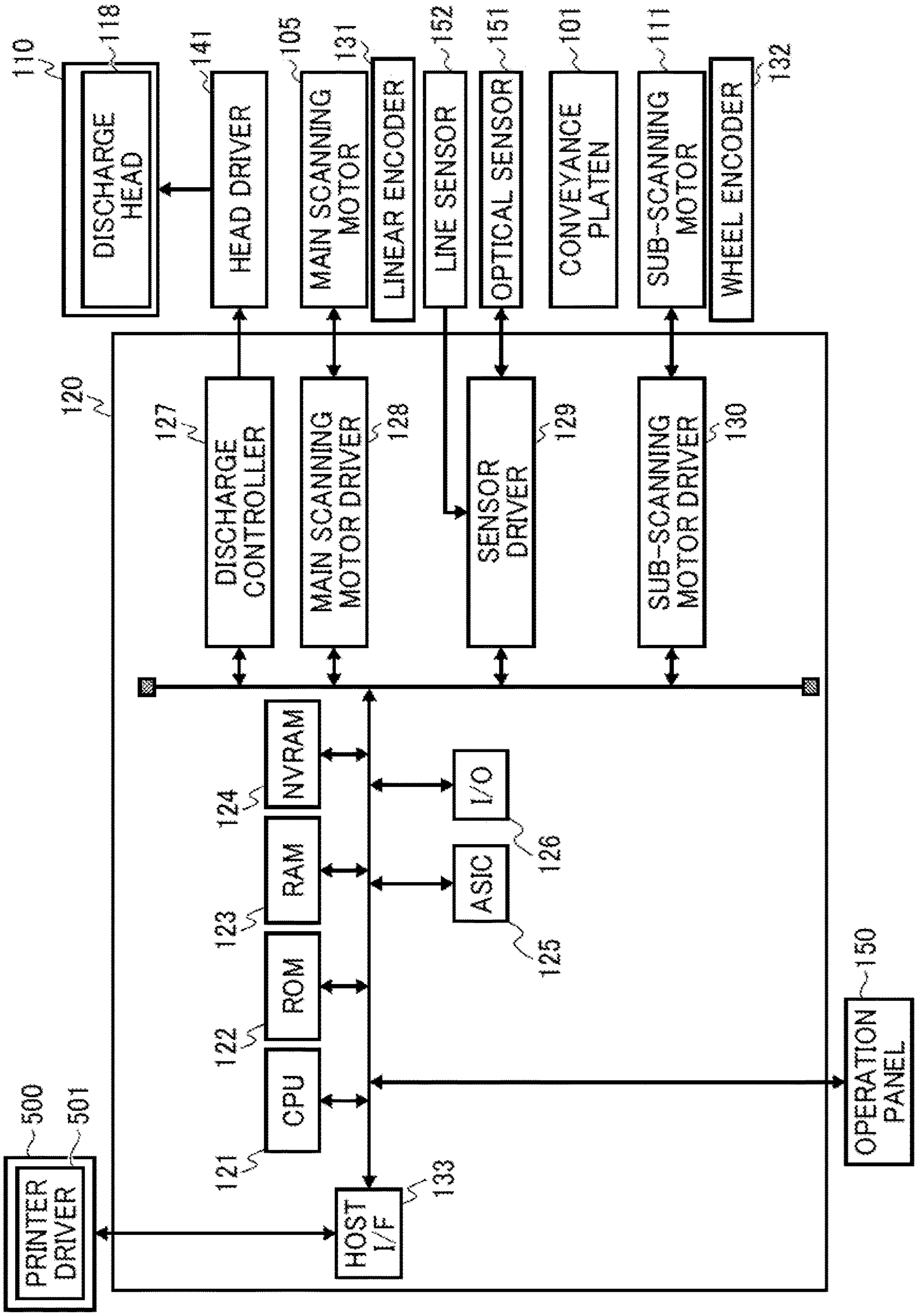
FIG. 2 is a schematic configuration diagram of a controller according to the present embodiment.

Next, a configuration of a control block included in the inkjet printer 100 according to the present embodiment will be described with reference to FIG. 2. As illustrated in FIG. 2, a control block 120 of the inkjet printer 100 includes a central processing unit (CPU) 121, a read-only memory (ROM) 122, a random access memory (RAM) 123, a non-volatile random access memory (NVRAM) 124, and an application specific integrated circuit (ASIC) 125.

The CPU 121 is connected to an operation panel 150 serving as a display operation unit through which preferable information is input to the inkjet printer 100 and displayed, and controls an operation of each functional component of the inkjet printer 100. The CPU 121 further includes a function of governing a control about a conveyance operation (movement in the sub-scanning direction) of the conveyance platen 101, a movement operation of the carriage 110 in the main scanning direction, and a liquid discharge operation by the discharge head 118.

The CPU 121 determines whether the amount of pretreatment liquid to be applied is appropriate, based on detection results of the optical sensor 151 and the line sensor 152, and based on such determination results, controls an operation of the discharge head 118 that discharges the pretreatment liquid. Such a control makes it possible to suitably apply the pretreatment liquid according to the water repellency of the surface of the fabric medium detected by the optical sensor 151 and the line sensor 152. This makes it possible to control the aggregation of the liquid ink so that it is possible to maintain a color expression state in which the color is expressed by using the liquid ink, as a suitable state.

The ROM 122 is a non-volatile storage medium in which a program executed by the CPU 121 and another fixed data are stored. When the program stored in the ROM 122 is executed by an arithmetic process function of the CPU 121, the controller 10 described later is configured.

The RAM 123 temporarily stores image data and the like used for image formation process. The RAM 123 functions as a work area used when the program controller is executed.

The NVRAM 124 is a rewritable non-volatile storage medium in which data is retained even while the inkjet printer 100 is powered off.

The ASIC 125 performs various types of signal process for image data, image process such as sorting, and in addition, process for input and output signals used to control the entire apparatus.

The control block 120 includes a host interface 133 (I/F 133), a discharge controller 127, a main scanning motor driver 128, a sensor driver 129, a sub-scanning motor driver 130, and an input/output unit 126 (I/O unit 126).

The host I/F 133 functions as a role of transmitting and receiving data and a control signal to and from a host side such as a printer driver 501 provided in an external device 500.

The discharge controller 127 generates a drive waveform for driving the discharge head 118, and outputs image data for selectively driving a pressure generation unit of the discharge head 118 and various data associated therewith to the head driver 141.

The main scanning motor driver 128 drives the main scanning motor 105.

The sensor driver 129 controls operations of the optical sensor 151 and the line sensor 152. The sensor driver 129 receives a detection signal detected by the optical sensor 151 and the line sensor 152, and passes such a detection signal to a functional block realized by information process executed in the CPU 121 or the like.

The sub-scanning motor driver 130 serves to drive the sub-scanning motor 111 that moves a cassette 200 in the sub-scanning direction.

The I/O unit 126 receives detection signals from various types of sensors desirably used for the operation of the inkjet printer 100.

In the control block 120, an image formation instruction about the image formation process is received through the host I/F 133 via a cable and a network from the printer driver 501 provided in the external device 500. The image formation instruction is generated by an information process device such as a personal computer (PC), an image reading devices such as an image scanner, and the printer driver 501 of the external device 500 provided with a host function of an imaging device such as a digital camera, for example.

In the control block 120 having received the image formation instruction, the CPU 121 reads and analyzes the image formation instruction in a reception buffer included in the host I/F 133. According to an analysis result, the ASIC 125 performs desirable imaging process, data rearrangement process, and the like, and transfers the resultant image to a discharge controller 127. Therefore, the discharge controller 127 outputs image data and a drive waveform to the head driver 141 at a desirable timing. It is noted that dot pattern data for image output may be generated by storing font data in the ROM 122, for example, or the image data may be developed into bitmap data by the printer driver 501 on the host side and transferred to the apparatus. Here, it is assumed that the dot pattern data for image output is generated by the printer driver 501, for example. Thus, the image formation instruction corresponds to discharge instruction information.

A drive waveform generation unit of the discharge controller 127 includes a D/A converter that D/A converts the pattern data of a drive pulse stored in the ROM 122 and read by the CPU 121, an amplifier, and the like. The drive waveform generation unit outputs a drive waveform including one drive pulse or a plurality of drive pulses to the head driver 141. The head driver 141 drives the discharge head 118, based on serially input image data (dot pattern data) corresponding to one line of the discharge head 118. Thus, the head driver 141 selectively applies the drive pulses including the drive waveform applied from the drive waveform generation unit of the discharge controller 127, to the pressure generation unit of the discharge head 118.

It is noted that the head driver 141 includes, for example, a shift register to which a clock signal and serial data as image data are input, and a latch circuit that latches a resist value of the shift register by a latch signal. The head driver 144 further includes a level conversion circuit (level shifter) in which an output value of the latch circuit is changed from one level to another, and an analog switch array (switch unit) controlled to be turned on or turned off by the level shifter. Functionally, in an example, when turning on and off of the analog switch array is controlled, the head driver 141 selectively applies the desirably used drive pulse included in the drive waveform to the pressure generation unit of the discharge head 118.

The image formation instruction includes, for example, information indicating a type of fabric medium. In the inkjet printer 100 according to the present embodiment, according to a kind of fabric medium placed on the conveyance platen 101, the amount of a predetermined pretreatment liquid to be applied may be selected. A state of the fabric medium surface immediately after the predetermined pretreatment liquid is applied is detected by the optical sensor 151 and the line sensor 152, and based on the detection result, the amount of pretreatment liquid is controlled.

[Description of Controller 10]

Figure 3:
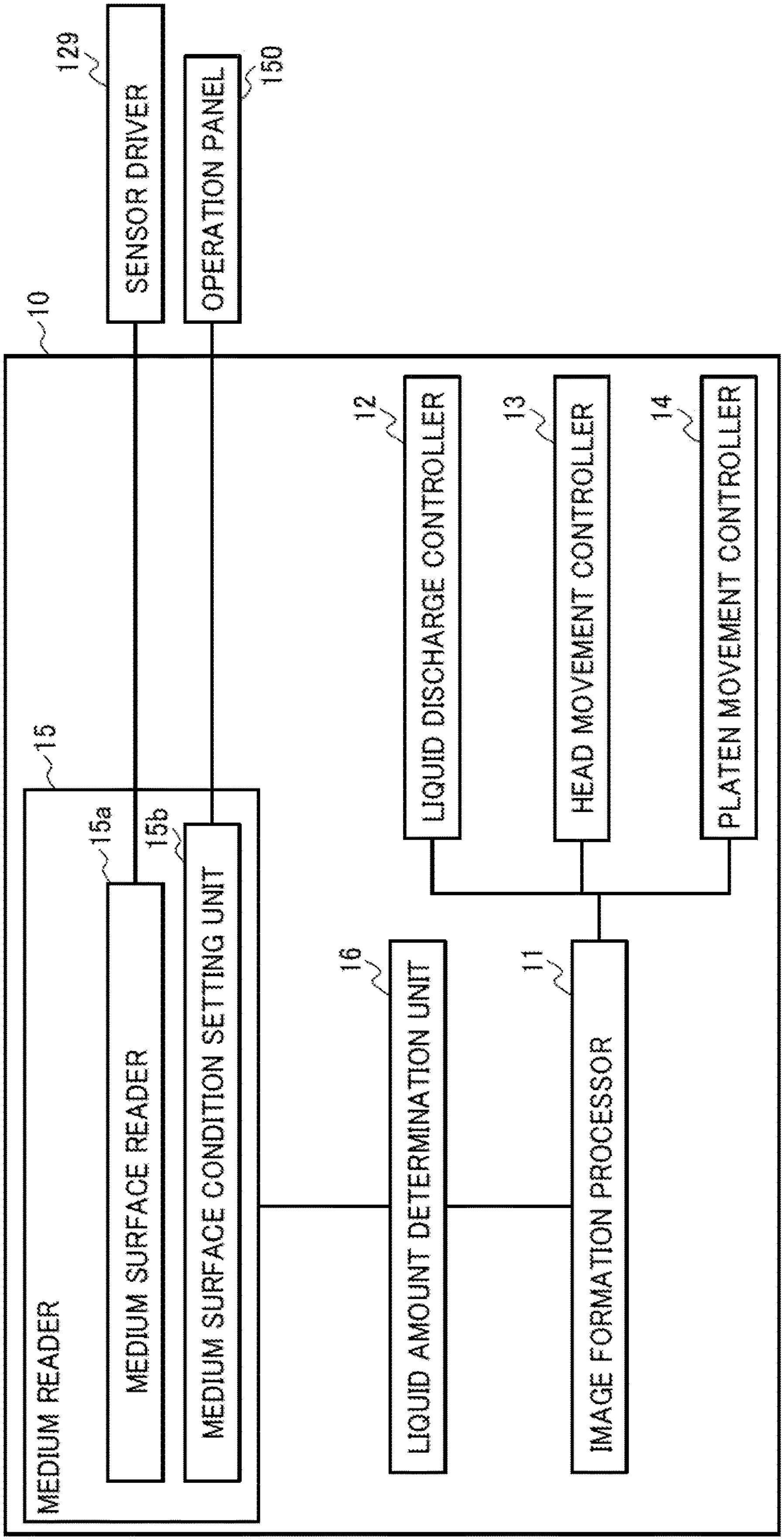
FIG. 3 is a functional block diagram of the controller according to the present embodiment.

Next, a functional configuration of the controller 10 that controls the inkjet printer 100 will be described with reference to FIG. 3. The controller 10 includes an image formation processor 11, a liquid discharge controller 12, a head movement controller 13, a platen movement controller 14, a medium reader 15 serving as a medium surface state detector, and a liquid amount determination unit 16 serving as a pretreatment liquid amount determination unit.

The image formation processor 11 generates image data for image formation, based on the image formation instruction from the external device 500, and applies an instruction to the liquid discharge controller 12, the head movement controller 13, and the platen movement controller 14 so that the image is formed on the fabric by using the image data. Further, the image formation processor 11 applies an instruction to the liquid discharge controller 12, the head movement controller 13, and the platen movement controller 14, so that image re-formation process is executed based on an instruction from an image re-formation instruction reception unit 17.

The image formation processor 11 generates, based on data indicating an increase/decrease in the amount of pretreatment liquid to be applied notified from the liquid amount determination unit 16, an instruction for controlling a behavior of the discharge head 118 that discharges (applies) the treatment liquid onto the medium surface. That is, the image formation processor 11 also functions as a pretreatment liquid applicator in the present embodiment. It is noted that such an instruction corresponds to the number of times of discharge process (application process) of the pretreatment liquid. It is noted that as long as a state where a predetermined treatment liquid is present on the medium surface is obtained, the number of times of control is not limited, and for example, a control may be performed to increase or decrease an amount of pretreatment liquid to be discharged in single discharge process.

The liquid discharge controller 12 drives, based on an instruction from the image formation processor 11, the discharge controller 127 so that the liquid (ink) is discharged at a predetermined timing or in a predetermined amount from the discharge head 118 via the head driver 141.

The head movement controller 13 controls, based on an instruction from the image formation processor 11, so that the main scanning motor driver 128 drives the main scanning motor 105 to move the carriage 110 in the main scanning direction.

The platen movement controller 14 controls, based on an instruction from the image formation processor 11, so that the sub-scanning motor driver 130 drives the sub-scanning motor 111 to move a stage 400 in the sub-scanning direction to execute a movement of the fabric held in a platen member 300 in a sub-scanning direction.

The medium reader 15 includes a medium surface reader 15*a* that detects an application state of the pretreatment liquid exhibiting the aggregation of the liquid ink and being applied onto the medium surface, based on the state of the medium surface detected by the optical sensor 151 or the line sensor 152. The medium reader 15 further includes a medium surface condition setting unit 15*b* that holds information about the water repellency of the medium surface set by the user via the operation panel 150.

The liquid amount determination unit 16 determines, based on a detection result from the medium surface reader 15*a* and the setting value held in the medium surface condition setting unit 15*b*, whether the amount of pretreatment liquid on the media surface is larger or smaller than the suitable amount. The liquid amount determination unit 16 notifies the image formation processor 11 of an instruction based on a determination result.

That is, when the amount of the pretreatment liquid on the medium surface is larger than the amount of the pretreatment liquid desirably used to exhibit a predetermined water repellency, the liquid amount determination unit 16 applies an instruction used to control the amount of pretreatment liquid to be applied to the image formation processor 11 so that the amount of pretreatment liquid to be applied is decreased than a predetermined amount. When the amount of pretreatment liquid on the medium surface is small, the liquid amount determination unit 16 applies an instruction to control the amount of pretreatment liquid to be applied to the image formation processor 11 so that the amount of pretreatment liquid to be applied is increased than a predetermined amount.

[Embodiment of Liquid Discharge Method]

Figure 4:
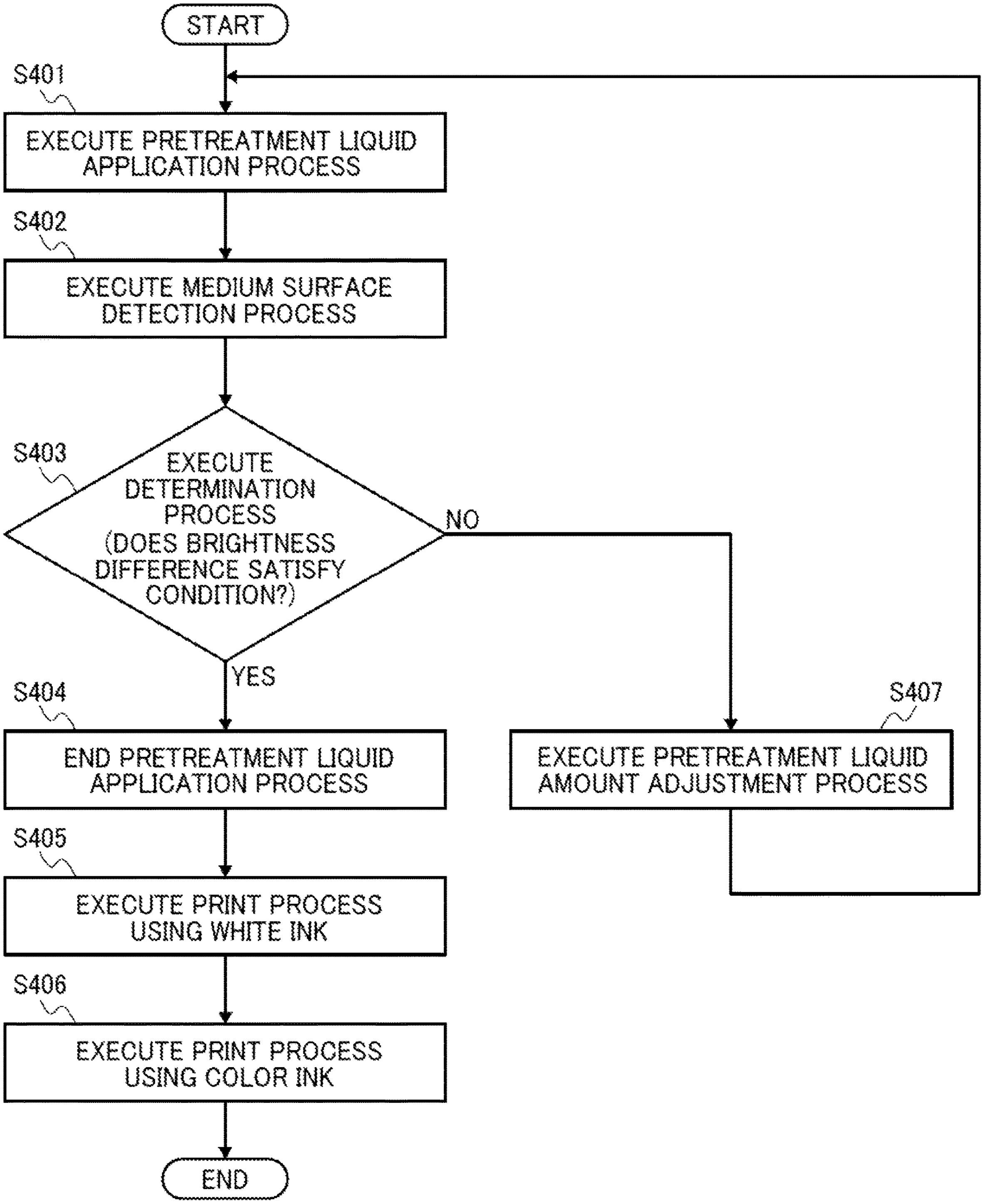
FIG. 4 is a flowchart illustrating a process flow as an embodiment of a liquid discharge method according to the present embodiment.

Next, as an embodiment of a liquid discharge method according to the present embodiment, a flow of liquid discharge control process executable in the inkjet printer 100 will be described using a flowchart. A flowchart illustrated in FIG. 4 illustrates an example of the flow of the liquid discharge control process according to the present embodiment.

First, when a liquid discharge process (image formation process) for the fabric medium is started, the application of the pretreatment liquid onto the fabric medium held on the platen is started (S401).

Subsequently, medium surface detection process to detect the state of the medium surface immediately after the pretreatment liquid is applied is executed (S402). In the medium surface detection process, the operation of the optical sensor 151 is controlled to receive a detection signal from the optical sensor 151 to optically read the state of the medium surface, for example. Further, in the medium surface detection process, the operation of the line sensor 152 is controlled to receive a detection signal from the line sensor 152 to scan and read the state of the medium surface in the sub-scanning direction.

The medium surface detection process (S402) is, for example, a process of detecting a "brightness difference" on the medium surface. Here, a case will be described in which the "brightness difference" is measured based on values detected by either one of or both the optical sensor 151 and the line sensor 152 and is used as a determination criterion. A reason the brightness difference is used as the determination criterion as in the present case is due to the color of the pretreatment liquid. That is, generally, the pretreatment liquid used when forming an image on a fabric medium such as a T-shirt is "transparent" or "white." When a "transparent" or "white" liquid is applied, a degree of reflection of light on the medium surface is improved, or the color close to white is obtained. Therefore, the brightness of the medium surface applied with the pretreatment liquid is higher (brighter) than the brightness of the medium surface applied with no pretreatment liquid.

That is, the ease with which the light is reflected on the medium surface after application of the pretreatment liquid is determined by how much pretreatment liquid exists on the medium surface. The user may set any condition used for determining the brightness difference such as "(brightness of area applied with pretreatment liquid)−(brightness of background of fabric medium)≥50". That is, an amount of pretreatment liquid remaining (existing) on the medium surface is determined by using a predetermined threshold value for the brightness difference.

When the medium surface detection process (S402) is executed, the operation of the inkjet printer 100 is suspended and an indication such as "check and set the water repellency of the medium surface" is provided on the operation panel 150. The user may visually observe the state of the pretreatment liquid applied on the medium surface, and input a setting value based on an observation result via the operation panel 150.

Based on a result detected by the medium surface detection a (S402), the setting value, and the above conditional expression, determination process is executed (S403). In the determination process, if the state of the medium surface satisfies a predetermined condition (a state of the medium surface is equal to or more than the brightness difference set by the user) (S403, YES), it is determined that the amount of pretreatment liquid to be desirably used to exhibit sufficient whiteness on the fabric medium is applied. In such a case, the application process of the pretreatment liquid is ended (S404).

Subsequent to the end of the application process of the pretreatment liquid, a print process using white ink is executed to form a desired image on the fabric medium (S405). Next, a print process using color ink is executed (S406). When the print process is ended, the present process is ended.

Further, in the determination process (S403), if the state of the medium surface does not satisfy a predetermined condition (state of the medium surface is not equal to or more than the brightness difference set by the user) (S403, NO), it is determined that the amount of pretreatment liquid to be desirably used to exhibit sufficient whiteness on the fabric medium is not applied. In such a case, information for increasing the amount of pretreatment liquid is generated and such information is notified to the image formation processor 11 to execute a pretreatment liquid amount adjustment process (S407) so that it is possible to confirm the amount of pretreatment liquid desirably used to satisfy the condition on the medium surface. As a result, the application process of the pretreatment liquid is performed until the condition is satisfied. That is, the application of the pretreatment liquid is repeated until it is possible to secure the amount of pretreatment liquid desirably used to exhibit the sufficient whiteness on the medium surface.

[Relationship between Water Repellency of Medium Surface and Pretreatment Liquid]

Figure 5A:
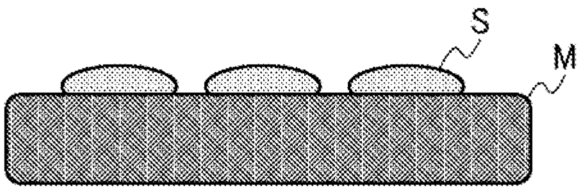
FIGS. 5A and 5B illustrate a relationship between an amount of pretreatment liquid to be applied and water repellency of a medium surface according to the present embodiment.

Next, a relationship between the water repellency of the medium surface and the amount of pretreatment liquid will be described with reference to the schematic diagram of FIG. 5. Depending on the water repellency of the medium surface, even if the same amount of pretreatment liquid is applied, when the medium surface has high water repellency, the pretreatment liquid may not easily permeate into the inside of the fabric medium. In such a case, as illustrated in FIG. 5A, a state where treatment liquid S spreads on a surface M of the fabric medium is obtained, and thus, in a region applied with the pretreatment liquid, a value of the brightness derived from a detection result of the optical sensor 151 or the like increases. As a result, it is determined that the amount of pretreatment liquid sufficient for aggregating the white ink on the medium surface is retained.

Figure 5B:
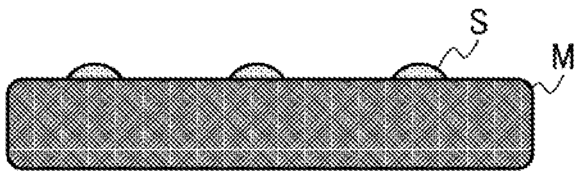

On the other hand, a case where the water repellency of the medium surface is low is illustrated in FIG. 5B. In such a case, the pretreatment liquid easily permeates into the fabric medium. Therefore, the brightness of the region applied with the pretreatment liquid does not greatly differ from the background color of the fabric medium, and thus, the brightness is easily lower than the brightness difference set by the user. That is, it is likely that the amount of pretreatment liquid sufficient for aggregating the white ink is not retained.

In the state of FIG. 5B, the determination process (S403) is branched so that the pretreatment liquid application process is performed again (S403: NO), and thus, the amount of pretreatment liquid to be discharged is adjusted (S407) so that a desirable amount of pretreatment liquid is applied, and the application process of the pretreatment liquid is performed (S401).

In the flowchart illustrated in FIG. 4, if the brightness value of the medium surface derived from the detection result of the optical sensor 151 or the line sensor 152 is lower than the brightness difference set by the user, the pretreatment liquid is applied on the fabric medium again. The pretreatment liquid is repeatedly applied until a sufficient amount of pretreatment liquid for exhibiting the sufficient whiteness is ensured.

Figure 6A:
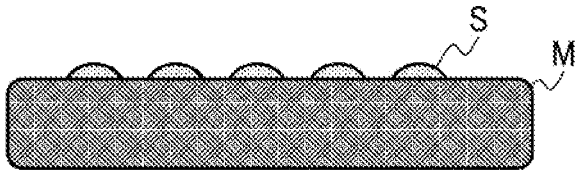
FIGS. 6A and 6B illustrate a relationship between an amount of pretreatment liquid to be applied and water repellency of a medium surface according to the present embodiment.
Figure 6B:
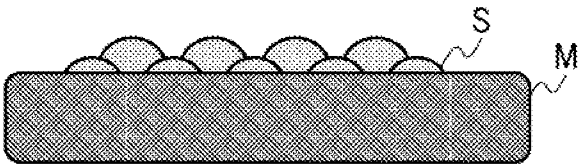

FIG. 6 illustrates a state of the pretreatment liquid on the medium surface when the pretreatment liquid application process (S401) is performed three times. It is assumed that a state illustrated in FIG. 5B is obtained after the first pretreatment liquid application process (S401) is ended. That is, after the pretreatment liquid is applied once, the amount of pretreatment liquid remaining on the medium surface is reduced as illustrated in FIG. 5B. A state of the medium surface after the second pretreatment liquid application process (S401) is performed after the first process (S401) is illustrated in FIG. 6A. That is, FIG. 6A illustrates a state where the pretreatment liquid application process (S401) is performed twice. As illustrated in FIG. 6A, when the pretreatment liquid is applied a plurality of number of times, it is possible to control the amount of pretreatment liquid remaining on the medium surface.

When the amount of pretreatment liquid remaining on the medium surface is adjusted by such repeated application process so that the brightness value on the medium surface is higher than the brightness difference set by the user, it is determined that a sufficient amount of pretreatment liquid is applied. In this state, if the process moves to an operation where a desired image is printed on the medium using the white ink and the color ink, it is possible to improve the quality of the image. It is noted that in preparation for a case where a predetermined brightness difference or higher is not obtained even if the application process is repeated, the user may set any maximum number of times of repetitions and such a maximum number may be implemented as a setting item of the inkjet printer 100.

Therefore, according to the state of the medium surface immediately after the pretreatment liquid is applied, an increase or a decrease in the number of times of applications is controlled. This makes it possible to set the amount of pretreatment liquid to be applied onto the medium surface to a suitable amount.

It is noted that in the determination process (S403) according to the present embodiment, the "brightness difference" is used as the determination criterion whether the amount of pretreatment liquid to be applied is sufficient, but the "brightness difference" is not limitedly used in the present embodiment. For example, "reflectance of light" may be employed instead of the "brightness difference" as the determination criterion. In such a case, a sensor that measures the reflectance of light is used to measure a value so that a preferably used amount of pretreatment liquid to be deposited is determined.

It is noted that the optical sensor 151 is mounted on the carriage 110 that scans the discharge head 118 that discharges the pretreatment liquid. Therefore, according to the medium surface detection process (S402) using the optical sensor 151, there are advantages in that it is possible to perform detection (measurement and imaging) simultaneously with the application of the pretreatment liquid, and it is possible to shorten a time period for detection (measurement and imaging).

When the line sensor 152 is mounted in the movement direction of the conveyance platen 101 as in the line sensor 152, a configuration may be employed in which the state of the medium surface is detected (measured) simultaneously with the conveyance of the conveyance platen 101. When the medium surface detection process (S402) by the line sensor 152 is executed, if the pretreatment liquid easily permeates the fabric medium, it is possible to collectively measure the state of the medium surface after the pretreatment liquid permeates sufficiently into the fabric medium. Thus, it is advantageous when the fabric medium into which the pretreatment liquid easily permeates is used. That is, a case may be avoid where immediately after the pretreatment liquid is applied, a state before the pretreatment liquid sufficiently permeates the fabric medium is measured, and when the white ink is applied, a sufficient amount of pretreatment liquid does not remain on the medium surface.

The medium surface detection process (S402) by the line sensor 152 has an advantage of being used even in a configuration where in the inside of an apparatus housing of the inkjet printer 100, the pretreatment liquid is not applied from the discharge head 118 but is applied by using a linear spray nozzle. That is, if the state of the medium surface is measured along with the carriage scanning, an elapsed time period from the application of pretreatment liquid varies between a near side and a far side of the conveyance platen 101, but the linear spray nozzle has an advantage of collectively measure the state of the medium surface.

It is noted that the present embodiment is not limited, and various modifications are possible without departing from the technical gist thereof. All technical matters included in the technical concept described in the claims are covered by the present embodiment. Although as the above embodiment, a suitable example is provided, a person skilled in the art can make various modifications from the disclosed contents. Such modifications are also included in the technical scope described in the claims.

According to the present embodiment, regardless of the water repellency, it is possible to control the amount of pretreatment liquid to be applied so that the expression with the liquid ink is suitable for the fabric medium.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

[Aspect 1]

A liquid discharge apparatus includes: an applicator configured to apply a first liquid onto a surface of a fabric medium to increase repellency of the surface of the fabric medium; a head configured to discharge a second liquid onto the surface of the fabric medium, onto which the first liquid has been discharged; a detector configured to detect the repellency of the surface of the fabric medium on which the first liquid has been discharged; and circuitry configured to: determine whether the repellency detected by the detector is equal to or larger than a predetermined repellency; and control the applicator to further apply the first liquid onto the surface of the fabric in response to a determination in which the repellency detected by the detector is lower than the predetermined repellency.

[Aspect 2]

In the liquid discharge apparatus according to Aspect 1, the circuitry: controls the applicator to apply the first liquid onto the surface of the fabric medium for multiple times, and controls a number of the multiple times to control an amount of the first liquid to be applied onto the surface of the fabric medium.

[Aspect 3]

In the liquid discharge apparatus according to Aspect 2, the circuitry decreases the number of the multiple times in response to a determination in which the repellency of the surface of the fabric medium being larger than the predetermined repellency.

[Aspect 4]

In the liquid discharge apparatus according to Aspect 2, the circuitry increases the number of the multiple times in response to a determination in which the repellency of the surface of the fabric medium being lower than the predetermined repellency.

[Aspect 5]

In the liquid discharge apparatus according to Aspect 1, the detector detects brightness difference to detect the repellency of the surface of the fabric medium on which the first liquid has been discharged.

[Aspect 6]

In the liquid discharge apparatus according to Aspect 1, the detector detects reflectance of light to detect the repellency of the surface of the fabric medium on which the first liquid has been discharged.

[Aspect 7]

In the liquid discharge apparatus according to Aspect 2, the circuitry is further configured to: control the detector to detect the repellency of the surface of the fabric medium immediately after the first liquid is applied onto the surface by the applicator; determine whether the repellency detected by the detector is equal to or larger than a predetermined repellency; and control the applicator to further apply the first liquid onto the surface of the fabric for the number of the multiple times to control an amount of the first liquid to be applied onto the surface of the fabric medium.

[Aspect 8]

In the liquid discharge apparatus according to Aspect 1, the applicator includes another head configured to discharge the first liquid onto the surface of the fabric medium.

[Aspect 9]

A liquid discharge method includes: applying a first liquid onto a surface of a fabric medium to increase repellency of the surface of the fabric medium; discharging a second liquid onto the surface of the fabric medium, onto which the first liquid has been discharged; detecting the repellency of the surface of the fabric medium on which the first liquid has been discharged; determining whether the repellency detected by the detecting satisfy predetermined repellency; and further applying the first liquid onto the surface of the fabric in response to a determination in which the repellency detected by the detecting does not satisfy the predetermined repellency.

The functionality of the elements disclosed herein, such as the controller 1 may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A liquid discharge apparatus comprising:

an applicator configured to apply a first liquid onto a surface of a fabric medium to increase repellency of the surface of the fabric medium;

a head configured to discharge a second liquid onto the surface of the fabric medium, onto which the first liquid has been discharged;

a detector configured to detect the repellency of the surface of the fabric medium on which the first liquid has been discharged; and circuitry configured to:

determine whether the repellency detected by the detector is equal to or larger than a predetermined repellency; and control the applicator to further apply the first liquid onto the surface of the fabric medium in response to a determination in which the repellency detected by the detector is lower than the predetermined repellency.

2. The liquid discharge apparatus according to claim 1, wherein the circuitry:

controls the applicator to apply the first liquid onto the surface of the fabric medium for multiple times, and controls a number of the multiple times to control an amount of the first liquid to be applied onto the surface of the fabric medium.

3. The liquid discharge apparatus according to claim 2, wherein the circuitry decreases the number of the multiple times in response to a determination in which the repellency of the surface of the fabric medium being larger than the predetermined repellency.

4. The liquid discharge apparatus according to claim 2, wherein the circuitry increases the number of the multiple times in response to a determination in which the repellency of the surface of the fabric medium being lower than the predetermined repellency.

5. The liquid discharge apparatus according to claim 1, wherein the detector detects brightness difference to detect the repellency of the surface of the fabric medium on which the first liquid has been discharged.

6. The liquid discharge apparatus according to claim 1, wherein the detector detects reflectance of light to detect the repellency of the surface of the fabric medium on which the first liquid has been discharged.

7. The liquid discharge apparatus according to claim 2, wherein the circuitry is further configured to:

control the detector to detect the repellency of the surface of the fabric medium immediately after the first liquid is applied onto the surface by the applicator;

determine whether the repellency detected by the detector is equal to or larger than a predetermined repellency; and control the applicator to further apply the first liquid onto the surface of the fabric medium for the number of the multiple times to control an amount of the first liquid to be applied onto the surface of the fabric medium.

8. The liquid discharge apparatus according to claim 1, wherein the applicator includes another head configured to discharge the first liquid onto the surface of the fabric medium.

9. A liquid discharge method comprising:

applying a first liquid onto a surface of a fabric medium to increase repellency of the surface of the fabric medium;

discharging a second liquid onto the surface of the fabric medium, onto which the first liquid has been discharged;

detecting the repellency of the surface of the fabric medium on which the first liquid has been discharged;

determining whether the repellency detected by the detecting satisfy predetermined repellency; and further applying the first liquid onto the surface of the fabric medium in response to a determination in which the repellency detected by the detecting does not satisfy the predetermined repellency.

* * * * *